United States Patent [19]

Krueger et al.

[11] 4,402,912
[45] Sep. 6, 1983

[54] DEVICE TO AUTOMATICALLY ADD A CONTROLLED AMOUNT OF CORROSION INHIBITOR WITH A CHANGE IN SPRING LOADING

[75] Inventors: Robert H. Krueger, Palatine; John L. Zambrow, Lincolnshire, both of Ill.

[73] Assignee: Borg-Warner Corporation, Chicago, Ill.

[21] Appl. No.: 333,967

[22] Filed: Dec. 23, 1981

[51] Int. Cl.³ .......................... G05D 3/00; B01J 4/02; C23F 11/08

[52] U.S. Cl. .................................. 422/107; 123/41.15; 137/268; 165/134 R; 210/205; 210/739; 210/746; 422/3; 422/108; 422/111; 422/112; 422/116; 422/237; 422/274; 422/277

[58] Field of Search ...................... 422/3, 107, 62, 108, 422/111, 112, 113, 236, 237, 274, 276, 277, 116; 165/134 R; 137/268; 123/41.15

[56] References Cited

U.S. PATENT DOCUMENTS

| | | |
|---|---|---|
| 3,023,778 | 5/1977 | Joly et al. ........................ 259/4 R |
| 3,390,695 | 7/1968 | King et al. ........................ 137/268 |
| 3,846,078 | 11/1974 | Brett . |
| 4,132,243 | 1/1979 | Kuus .................................. 137/268 |
| 4,249,562 | 2/1981 | King .................................. 137/268 |
| 4,270,565 | 6/1981 | King .................................. 137/268 |
| 4,331,174 | 5/1982 | King .................................. 137/268 |
| 4,333,516 | 6/1982 | Krueger et al. ............ 165/134 R X |
| 4,338,959 | 7/1982 | Krueger et al. ............ 165/134 R X |
| 4,338,997 | 7/1982 | Krueger et al. ................ 165/134 R |

FOREIGN PATENT DOCUMENTS 522575 6/1940 United Kingdom .

Primary Examiner—Barry S. Richman
Attorney, Agent, or Firm—James A. Geppert

[57] ABSTRACT

A system for the addition of a corrosion inhibitor to an engine cooling system wherein a container in the coolant system holds the corrosion inhibitor in a solid package which is withheld from contact with the coolant solution by a spring under load. The inhibitor package is counterbalanced by a pair of opposed springs with one spring being subject to corrosion when the corrosive effect of the coolant increases; corrosion of the spring allowing the inhibitor package to be urged into contact with the solution to provide treatment thereof.

15 Claims, 7 Drawing Figures

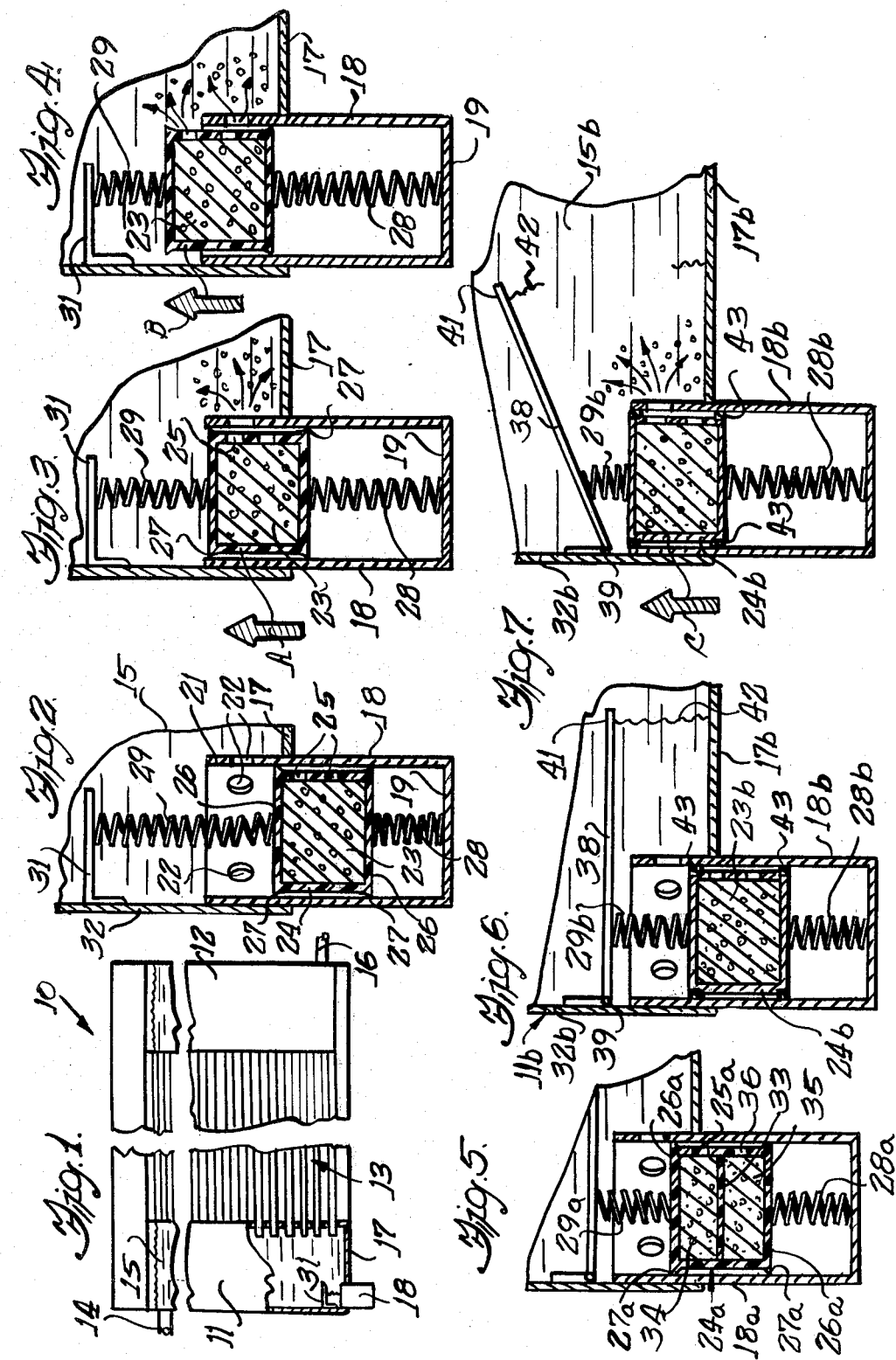

DEVICE TO AUTOMATICALLY ADD A CONTROLLED AMOUNT OF CORROSION INHIBITOR WITH A CHANGE IN SPRING LOADING

BACKGROUND OF THE INVENTION

Conventionally, engine coolants for a vehicle engine cooling system contain an appropriate corrosion inhibitor to combat any impurities in the water which can cause corrosion in the radiator or heat exchanger, coolang passages of the engine block, the pump, the thermostat and the connecting pipes. The corrosion inhibitor typically restricts corrosion and may coat the exposed surfaces with a passive layer to protect the surface from corrosive water. However, different inhibitors are required for different circumstances depending on the materials employed, such as copper-brass or aluminum radiators.

The useful life of the corrosion inhibitor supplied in an ethylene glycol antifreeze is limited and the protective quality of the inhibitor will decrease with age. Obviously, the protection will decrease more rapidly if the coolant is lost through leakage, boil over, etc. To prevent corrosion, it has been proposed to place in the coolant system a quantity of a low solubility inhibitor product for continuous dissolution, however, the inhibitor product may be consumed before it is required and thus lose its effectiveness. The present invention overcomes these problems by providing a corrosion inhibitor that is withheld from contact with the coolant until the corrosive characteristics of the liquid are such as to require additional inhibitor to prevent corrosion in the coolant system and in the heat exchanger in particular.

SUMMARY OF THE INVENTION

The present invention comprehends the provision of a novel device for automatically adding a corrosion inhibitor to a coolant system based on spring loading. The inhibitor is provided as a compact package located in a well or container in the inlet or outlet tank for a heat exchanger or radiator and retained in the container by a pair of springs bearing on opposite sides of the package; the inhibitor being normally separated from contact with the coolant. The spring preventing the package from entering the tank is exposed to the coolant and subject to corrosion whereby the spring weakens to allow the inhibitor package to move out of its container for exposure to the coolant and dissolution.

The present invention also comprehends the provision of a device for adding corrosion inhibitor based on spring loading wherein a thin wire and spring acting on a lever are utilized to counterbalance another stronger spring acting to urge the inhibitor package into the heat exchanger tank. The wire retains the pivotal lever to compress the spring above the inhibitor package, and both the spring and wire are exposed to the coolant and subject to corrosion. When the wire and/or spring corrode, the stronger spring is able to move the inhibitor package into contact with the coolant where the inhibitor will be dissolved.

Further objects of the present invention are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a schematic showing partially in cross section of a cross flow heat exchanger or radiator with the structure to automatically add corrosion inhibitor mounted in the inlet header tank.

FIG. 2 is an enlarged partial cross sectional view showing the inhibitor addition structure in normal position with properly inhibited coolant.

FIG. 3 is an enlarged partial cross sectional view similar to FIG. 2, but showing an intermediate position of the inhibitor package.

FIG. 4 is an enlarged partial cross sectional view similar to FIG. 2, but showing the position of the inhibitor package when the upper spring fully corrodes.

FIG. 5 is an enlarged partial cross sectional view similar to FIG. 2, but showing an inhibitor package providing more than one charge of inhibitor.

FIG. 6 is an enlarged partial cross sectional view of an alternate structure for automatically adding corrosion inhibitor in normal position with a properly inhibited coolant.

FIG. 7 is an enlarged partial cross sectional view similar to FIG. 6 but showing the position of the inhibitor under corrosive conditions.

DESCRIPTION OF THE PREFERRED EMBODIMENTS

Referring more particularly to the disclosure in the drawings wherein are shown illustrative embodiments of the present invention. FIG. 1 discloses a cross flow heat exchanger or radiator 10, such as utilized in an automotive vehicle cooling system for the vehicle engine. The radiator includes an inlet header tank 11 and an outlet header tank 12 connected by a tube core 13 extending therebetween, a coolant inlet 14 for admitting coolant 15 into tank 11, and a coolant outlet 16 leading from the outlet tank to a coolant pump for the engine (not shown).

As better seen in FIG. 2, a cylindrical container or tube 18 is located in the lower wall 17 of the inlet header tank 11 and has a closed lower end 19 and an upper open end 21 projecting into the tank above the tank wall 17. The upper projecting end 21 has a plurality of openings 22 formed in the wall to allow coolant to enter the tube below the upper edge thereof for controlled dissolution of the solid inhibitor. A block of a suitable corrosion inhibitor 23, such as a mixture of one or more inorganic salts, e.g. phosphates, borates, nitrates, nitrites, silicates or arsenates, and an organic compound, e.g. benzotriazole, tolyltriazole or mercaptobenzothiazole, is located in a package 24 formed of a suitable plastic, such as glass filled nylon, with openings 25 in the side wall and sealed upper and lower ends 26,26. The package is sealed from the outside fluid by a pair of resilient wiping edges or flanges 27,27 formed on the package and is retained in the position shown in FIG. 2 by a pair of compression springs 28 and 29, the upper spring 29 being preferably formed of the same material as the radiator 10. For example, an aluminum spring 29 would be utilized for an aluminum radiator. The lower spring 28 is compressed between the inhibitor package 24 and the lower end 19 of the container 18 and does not contact the coolant fluid.

The upper spring 29 is compressed between the inhibitor package and an abutment 31 in the tank side wall 32. The force of spring 29 remains constant so long as it does not corrode in the inhibited coolant 15. However, if the inhibitor content decreases or the coolant is lost and replaced by water, then the spring 29 will begin to weaken as corrosion begins. A reduced spring force of spring 29 allows the spring 28 to urge the inhibitor package 24 into the coolant zone where the inhibitor will be dissolved by contact with the coolant fluid, thus adding corrosion inhibitor to the coolant solution. As seen in FIG. 3, the package 24 is raised (arrow A) so that the openings 25 in the package at least partially overlap or coincide with the openings 22 in the upper end 21 of the container 18 to allow controlled dissolution of the inhibitor.

As the spring 29 weakens further due to corrosion, the package is raised higher (arrow B) until the spring breaks to finally release all of the inhibitor to the solution (FIG. 4). Although shown as a completely enclosed package, the block of inhibitor could be sealed from the outside fluid by upper and lower piston-type plates above and below the inhibitor 23 and movable in the container; sealing of the inhibitor being accomplished by a piston ring or wiping edge or flap around the periphery of each plate. Also, although shown in the inlet header tank 11, the container for the inhibitor could be located in either the radiator outlet tank 12 or in a reservoir overflow tank for the coolant in the cooling system.

An alternate inhibitor package 24a is shown in FIG. 5 positioned in the container 18a between the springs 28a and 29a, the container being formed of an inert plastic with closed ends 26a,26a and a central partition 33 dividing the inhibitor into an upper charge 34 and a lower charge 35. The upper compartment has openings 25a and the lower compartment has openings 36 in the side wall; the package having upper and lower wiping edges or flanges 27a,27a and may have a central seal.

In operation, the package will move upward as the upper spring 29a corrodes to uncover the upper openings 25a to dissolve the upper inhibitor charge 34; this position coinciding with that of FIG. 3. As this will increase the level of inhibitor in the coolant, corrosion of the spring 29a will cease. When the coolant again becomes corrosive, the spring again corrodes allowing the package to move upward to a position similar to FIG. 4 to dissolve the lower charge 35 of the inhibitor. Obviously, two or more partitions could be utilized in the inhibitor package for multiple charges of corrosion inhibitor.

FIGS. 6 and 7 disclose an alternate arrangement for the spring loading of an inhibitor package 24b in a container 18b in the radiator inlet tank 11b. In this embodiment, a lower spring 28b is located in the container 18b below the inhibitor package 24b, and an upper spring 29b is compressed between the inhibitor package 24b and an elongated lever 38 pivoted at fulcrum 39 on the header tank side wall 32b. The free end 41 of the lever 38 is anchored to the lower tank wall 17b by a thin wire 42 extending between the lever end 41 and the wall 17b.

The inhibitor package 24b is shown formed of an inert metal, such as a stainless steel not in contact with other metallic components and has piston rings 43 sealing the upper and lower edges of the package in the container 18b; although the container could be formed of a plastic as in the previous embodiments. Under normal conditions with properly inhibited coolant, the package 24b is held in place so that it will not move due to the counterbalanced nature of the springs 28b,29b and wire 42; spring 28b having no contact with the coolant solution, whereas spring 29b and wire 42 are continuously immersed in the coolant (FIG. 6). The forces of the spring 29b and wire 42 remain constant so long as corrosion does not occur. However, if the coolant becomes corrosive through loss of inhibitor, the wire 42 will corrode first; weakening, bending or breaking to release the lever 38 and cause the inhibitor package 24b to be forced upward (arrow C) into the coolant solution 15b by the lower spring 28b (FIG. 7), and contact with the solution dissolves the inhibitor to add corrosion inhibitor to the solution. The thickness of the wire 42 and its corrosion rate can be varied using the principle of levers; the farther the wire 42 is from the fulcrum or pivot 39, the thinner or weaker the wire can be made.

We claim:

1. A device for the automatic addition of a chemical corrosion inhibiting additive to a solution requiring treatment, comprising a tank or reservoir for a solution circulating through a fluid system, a container positioned in a wall of the tank with an open end opening into the tank wall, a package movably mounted in the container and containing solid chemical corrosion inhibiting additive, said package being in sliding sealing contact with said container, an abutment in said tank above the open container end, a first spring within said container engaging the lower end of said additive package, a second spring located between and engaging the upper end of said package and said abutment within said solution, said second spring being constructed of a material which is corridible by a corrosive solution, such that said package remains out of contact with the solution until the inhibitor level is insufficient to protect said second spring against corrosion, at which time the second spring decreases in force due to corrosion thereof so that the force of the first spring overcomes the second spring to raise the package and additive into contact with said solution for dissolution thereof.

2. A device as set forth in claim 1, in which said abutment is stationary.

3. A device as set forth in claim 1, in which said open end portion of the container projects beyond the tank wall and has one or more openings therein, and said package has an open portion which, when at least partially overlapping said container openings, allows the solution to contact and dissolve said additive.

4. A device as set forth in claim 3, wherein said fluid system is a coolant circulating system for the engine of an automotive vehicle, and said container is located in the inlet or outlet tank in the radiator or the coolant reservoir for the system.

5. A device as set forth in claim 4, in which said second spring is formed of a material substantially identical to the material of the radiator to be protected, and said first spring is sealed out of contact with the coolant solution.

6. A device as set forth in claim 4, wherein the abutment is a lever fulcrumed on a tank side wall above the container and has a free end, and a corrodible wire extends between and is secured to the free end of the lever and the first mentioned tank wall.

7. A device as set forth in claim 4, in which said inhibitor package is formed of a plastic material having peripheral wiping edges at the upper and lower ends thereof in sealing engagement with said container, the package having openings in the side wall to allow entrance of solution once the package is raised to the level of said container openings.

8. A device as set forth in claim 4, in which said package is formed of an inert metallic material unaffected by the coolant solution and has openings in the side wall, and piston rings at the upper and lower ends of the metallic package in sealing engagement with said container.

9. A device as set forth in claim 3, in which said package encloses said solid additive and has openings in the side wall thereof to allow entrance of said solution.

10. A device as set forth in claim 9, in which said package is formed of a resilient material with wiping edges at the upper and lower ends to sealingly engage the container wall.

11. A device as set forth in claim 9, in which said package is formed of an inert metallic material and has piston rings at the upper and lower edges thereof to sealingly engage the container wall.

12. A device as set forth in claim 9, in which said package includes at least one central partition dividing said additive into two or more portions.

13. A device as set forth in claim 12, in which said package has openings communicating with each additive portion.

14. A device for the automatic addition of a chemical corrosion inhibiting additive to a solution requiring treatment, comprising a tank or reservoir for a solution circulating through a fluid system, a container positioned in a wall of the tank with an open end opening into the tank wall, a package movably mounted in the container and containing solid chemical corrosion inhibiting additive, said package being in sliding sealing contact with said container, an elongated lever pivoted at an adjacent tank wall in said tank above the open container end, a thin wire extending between and secured to the free end of the lever and to said first mentioned tank wall, a first spring within said container engaging the lower end of said additive package, a second spring in said solution located between and engaging the upper end of said package and said lever, said wire being formed of a material which is corrodible by a corrosion solution, such that said package remains out of contact with the solution until the inhibitor level in the solution decreases below a predetermined level and the wire will corrode and break releasing said lever so that said first spring can raise the inhibitor package and additive into contact with said solution for dissolution thereof.

15. A device as set forth in claim 14, in which said open end portion of the container projects beyond the first mentioned tank wall and has one or more openings therein, and said package has openings which, when at least partially overlapping said container openings, allows the solution to contact and dissolve said additive.

* * * * *